Dec. 13, 1955 E. H. SPRECKELMEIER Re. 24,101

CONTROL SYSTEM FOR FOLDING MACHINES

Original Filed Dec. 26, 1947 4 Sheets-Sheet 1

INVENTOR
EDWIN HENRY SPRECKELMEIER

BY Hyde, Meyer, Baldwin & Doran
ATTORNEYS

CONTROL SYSTEM FOR FOLDING MACHINES

Original Filed Dec. 26, 1947 4 Sheets-Sheet 2

INVENTOR
EDWIN HENRY SPRECKELMEIER
BY Hyde, Meyer, Baldwin & Doran
ATTORNEYS

CONTROL SYSTEM FOR FOLDING MACHINES

Original Filed Dec. 26, 1947 4 Sheets-Sheet 3

INVENTOR
EDWIN HENRY SPRECKELMEIER
BY Hyde, Meyer, Baldwin & Doran
ATTORNEYS

CONTROL SYSTEM FOR FOLDING MACHINES

Original Filed Dec. 26, 1947 4 Sheets-Sheet 4

INVENTOR
EDWIN HENRY SPRECKELMEIER
BY Hyde, Mazer, Baldwin & Doran
ATTORNEYS

United States Patent Office

Re. 24,101
Reissued Dec. 13, 1955

24,101

CONTROL SYSTEM FOR FOLDING MACHINES

Edwin Henry Spreckelmeier, Cincinnati, Ohio, assignor to The American Laundry Machine Company, Cincinnati, Ohio, a corporation of Ohio Original No. 2,643,879, dated June 30, 1953, Serial No. 794,049, December 26, 1947. Application for reissue June 29, 1955, Serial No. 519,016

32 Claims. (Cl. 270—81)

Matter enclosed in heavy brackets [ ] appears in the original patent but forms no part of this reissue specification; matter printed in italics indicates the additions made by reissue.

This invention relates to electronic control devices for folding machines, such as are used for folding sheets of paper, or flatwork in connection with laundry operations. One common use of machines of this kind is for automatically folding in succession a large number of like rectangular flat articles, such as sheets, tablecloths, pillowcases, towels or the like, which are generally of the same size but actually may vary somewhat in length and width. The control mechanism for such a machine causes it to produce one or two cross folds in the article at points proportionate to its length, regardless of its actual length. The folds may be produced, for example, at the quarter and half points, or at the one-third and two-thirds points, or at other places.

The present invention is an improvement upon that described, shown and claimed in Letters Patent No. 2,374,779, granted May 1, 1945, to John E. Preston for Sequence Timer and Measuring Control, as well as to the invention of an application for Letters Patent filed December 26, 1947, by Thomas J. Doran for Timing Device for Folding Machine, Serial No. 793,806, *Patent No. 2,516,454, granted July 25, 1950.*

Brief reference to said patent*s* [and application] is desirable.

According to the Preston invention, articles to be folded may be given either one or two cross folds at a point or points proportional to its length. The control system accordingly includes either one or two electronic measuring devices controlled by one or two trips actuated by the leading and trailing edges of the traveling articles. When only a single fold is produced, means is provided to prevent a second closely following article from interfering with the measuring and folding operations upon its predecessor, but such an arrangement involves the use of two trips, spaced apart along the path of article travel.

When but one trip is used, it is possible to produce only one fold either at a definite distance from the leading edge or at a point proportional to article length.

According to the invention of the said Doran *patent* [application] two pairs of electronic measuring devices are alternately employed, together with two trips for controlling them and producing the measuring effect and a third selector trip to cause alternate operation of the two pairs, but only for producing a single fold.

One object of the present invention is to provide improved control mechanism for a folding machine of the kind described, in which but a single trip is necessary, and which includes two or more sets of measuring devices employed successively, or in order, each set being adapted to cause the production of two cross folds in the article at points proportionate to their length, regardless of their actual length.

A further object is to provide improved means, in a control system of the kind described, for producing two cross folds in an article, proportionately to its length, but in which a closely following article does not interfere with the measuring or folding of its predecessor.

Still another object its to simplify the control mechanism by reducing the number of trips affected by the traveling articles, but retaining all advantages of proportional folding on a series of articles differing in length.

A further object is to provide improved control mechanism, including two or more sets of measuring devices, employed alternately or in succession, in which the operation or actuation of one set, by one article, prepares another set for actuation or operation by a second or following article, and so on, so that the sets may be used successively, by selection, or in order, thereby preventing one article from interfering with another.

Further objects of the invention in part are obvious and in part will appear more in detail hereinafter.

Figure 1:
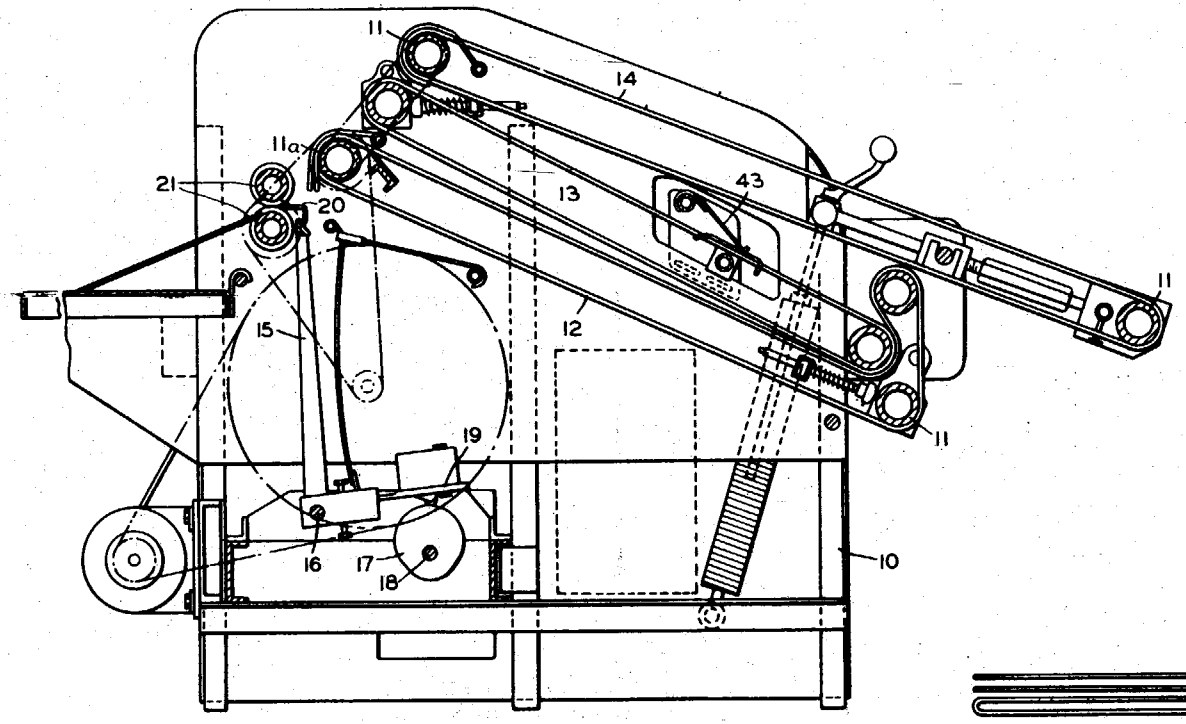
Fig. 1 represents a central longitudinal section through one form of machine embodying the invention.

The invention may be applied for use as a part of any type of folding machine in which several flat articles of the kind referred to are folded in succession, each at a plurality of points located proportionately to the length of the article, regardless of its actual length, such as at the third and two-thirds points, the quarter and half points, or in any other proportion. For convenience, and in no sense of limitation, the invention will be described as applied to a machine for folding sheets at the quarter and half points, thus producing an article which, viewed endwise, is of the form illustrated in Fig. 7.

The folding machine itself might well be of the form shown in the aforesaid Preston patent, but, as illustrated, is generally similar to that shown in a prior application for Bypass Mechanism for Folding Machines, Serial No. 677,368, filed June 17, 1946, *Patent No. 2,510,185, granted June 6, 1950,* by Clifton S. Malott, Jr., to which reference may be had if desirable or necessary.

Briefly described the folding machine includes a suitable frame 10 in which are mounted rollers 11 over which travel three sets of endless belts or tapes 12, 13, 14 for advancing the articles in succession so that finally they emerge at and over the last roll 11a, the advancing edge moving down in front of an oscillating folding arm 15 pivoted at 16 and actuated by a cam 17 rotatable on a suitably driven constantly rotating shaft 18, said cam engaging a second arm 19 fastened to and moving with folding arm 15. A blade 20 at the upper end of arm 15 serves as a support over which the articles are draped in succession, and also as a knife for introducing the draped article to the bite between two folding rolls 21, between which it passes under roll pressure to produce and compress the folds. Movement of the folding arm 15 back and forth, together with the rate of travel of the article and the timing of its movement with reference to arm movement, determines the exact points at which the cross folds are produced, while the folding rolls, together with the blade on the arm which introduces the article to the bite of the rolls, constitute the folding devices.

Cam 17 is rotated intermittently, or at intervals, by any suitable half revolution mechanism. That shown includes a fine tooth clutch including two members 22, 22a, the former fast with shaft 18 and the latter rotatable and movable endwise upon said shaft. Also mounted upon the shaft are two cams 23, 24, members 17, 22a, 23 and 24 being fastened together so that they all turn and move endwise as a unit upon the shaft. The unit is biased toward clutch closed position by a compression spring 25.

Figure 2:
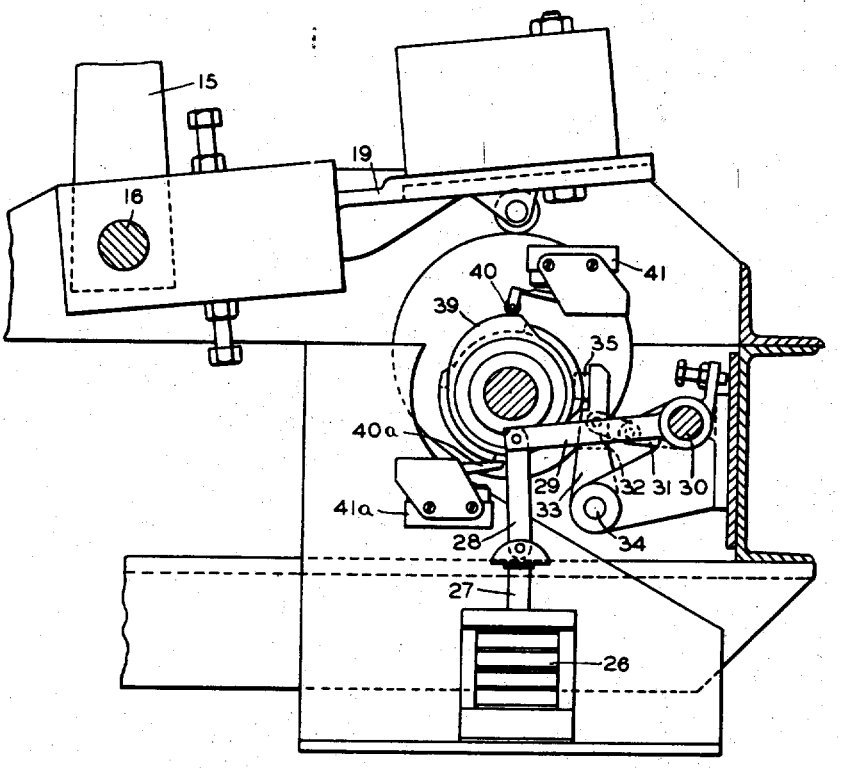
Fig. 2 is a detail end view of a controlling drum switch mechanism.

To operate the clutch I provide a solenoid 26 (Fig. 2) the movable core or armature 27 of which is connected by a link 28 to an arm 29 mounted on a rotatable shaft 30, having a second arm 31 connected by link 32 to a lever 33 pivoted at 34 and provided with a pin or pawl 35. This pin cooperates with an annular shoulder 36 upon cam 23, said shoulder having two inclined portions 37 each terminating in a stop recess 38, the two recesses being diametrically spaced with respect to the shaft center.

Cam 24 is provided with a single lobe 39 adapted to cooperate successively with a roller 40 and a switch arm 40a, each connected to the operating arm of a small spring closed or normally open electric switch, such switches being marked 41, 41a respectively.

Figure 4:
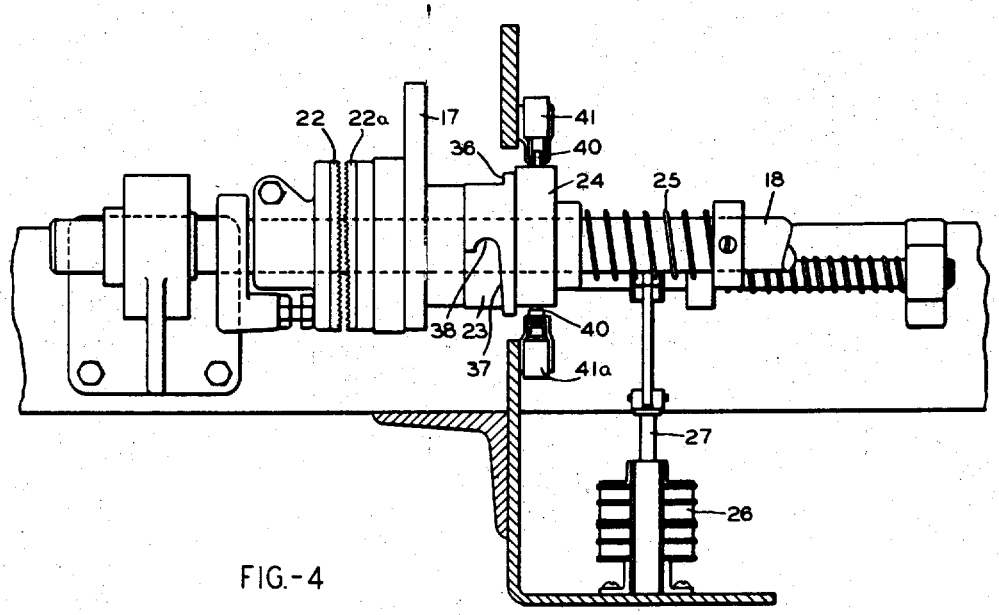
Fig. 4 is a front elevation of the same parts.

Normally the clutch is open, as in Fig. 4, pin 35 lying alongside the shoulder 36 and entering the recess 38 concealed on the far side of shaft 18 in that view. Thus, the pin holds the clutch open. Whenever solenoid 26 is energized, it pulls down the lever 29 and through members 31, 32, turns lever 33 clockwise in Fig 2 and withdraws the pin 35 from recess 38, thus releasing the clutch unit for endwise movement. Thereupon spring 25 expands and closes the clutch.

Figure 3:
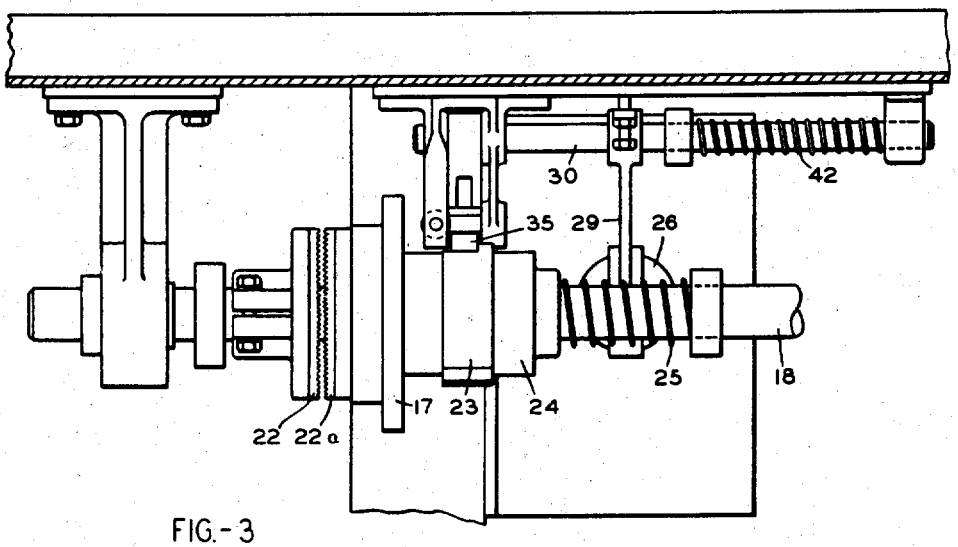
Fig. 3 is a detail plan view of the parts shown in Fig. 2.

In the normal position of the parts, shown in Fig. 4, the roller of the upper switch 41 lies on the cam 39, which holds that switch closed. As soon as clutch 22, 22a, closes, the several cams and both clutch parts rotate with the shaft through 180°. Almost immediately, when these parts start to rotate, cam 39 leaves roller 40 and switch 41 opens. As the parts approach completion of 180° movement, solenoid 26 having been deenergized a torsion spring 42 (Fig. 3) returns the solenoid core, links, lever, and pin 35 to their original positions, with the pin 35 alongside the shoulder 36, so that when the inclined portion 37 of said shoulder comes around, the clutch and several cams of the unit return to clutch open position and terminate the half revolution cycle, the final effect being for the cam 39 to engage the switch arm 40a of the second switch 41a and close it, leaving the parts as they were before, but advanced 180°, and ready for the next clutch operation.

Thus, each time solenoid 26 is energized, one of the two switches is immediately opened; then the cam 17 moves the folding arm 15 in one direction or the other, then the other switch is closed, and the parts stop. The purposes of the switches will be referred to later.

The measuring devices, for determining the points where cross folds are to be produced, may be either electrical or electro-mechanical in form, both arrangements being illustrated in the aforesaid Preston patent. For convenience only, and in no sense of limitation, the present application shows electronic measuring devices.

Figure 5:
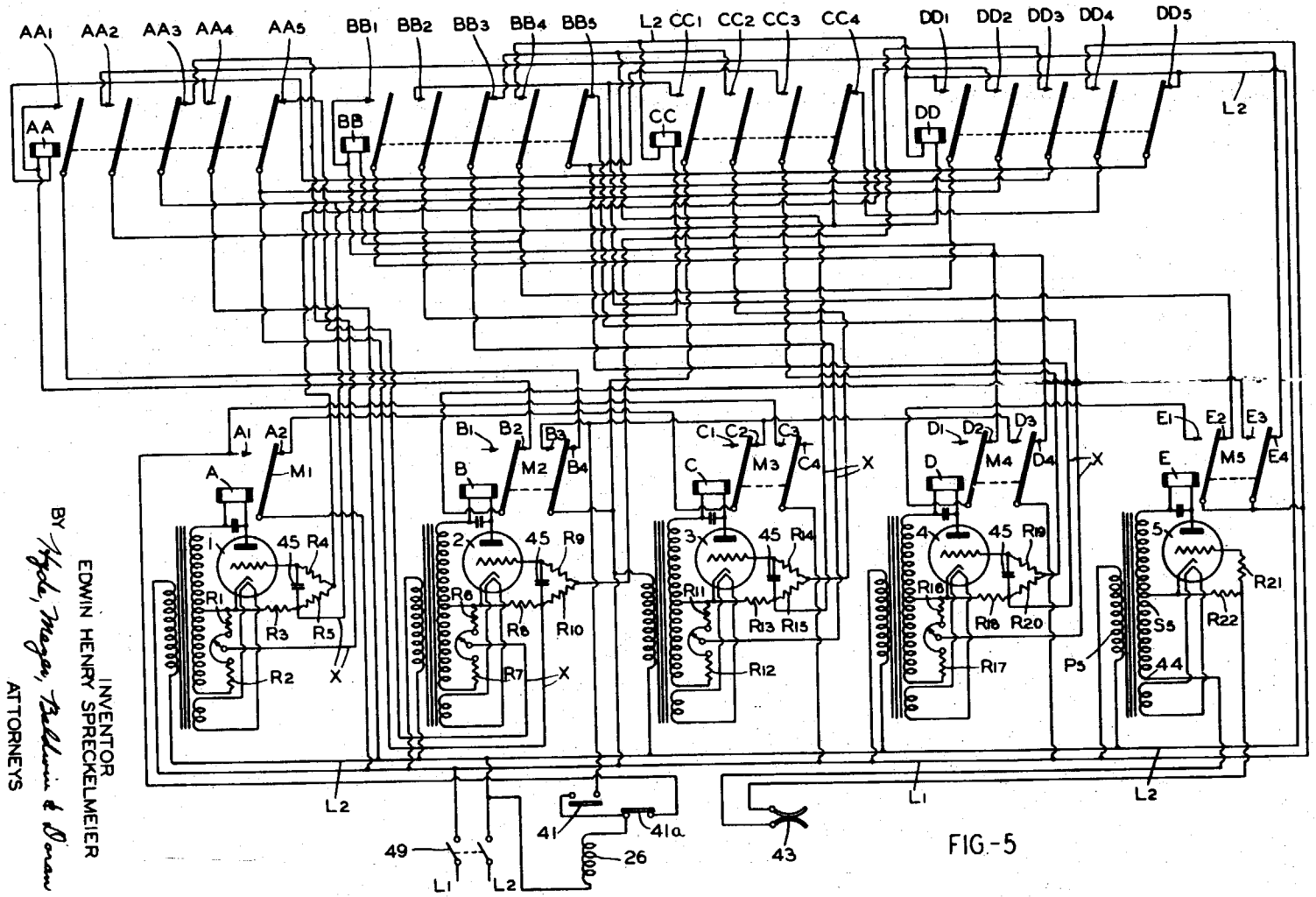
Fig. 5 is a diagram of the controlling circuits and other parts.

The electronic control system includes but a single trip device, shown at 43, Fig. 1, and also in Fig. 5.

Referring now to Fig. 5, the electronic control and measuring system includes five electronic tubes numbered respectively 1, 2, 3, 4 and 5, all of the four element type including plate, grid, cathode and filament, as shown. The circuits for the tubes 1 to 4 inclusive are quite similar while those for tube 5 are somewhat different, so that it will be described first.

The voltage applied to the grid of tube 5 is A. C. voltage from the secondary $S_5$ of a transformer, the primary $P_5$ of which is in a circuit from $L_1$ to $L_2$. The energizing circuit is from the point 44 through the sheet contact 43 to resistor $R_{21}$ to the grid, thence to the cathode and thence through the secondary back to the starting point, with consequent flow from grid to cathode of tube 5 during the half cycles when terminal 44 is positive with respect to the center terminal. The grid and cathode elements in this instance function as a rectifier in which the grid acts as an anode. Tube 5 is blocked from passing current as long as the sheet contact 43 is closed, but as soon as that contact is interrupted or opened by the passage of the [passage of the] leading edge of a traveling article, the tube passes sufficient plate current to immediately energize the coil of relay E, later to be referred to.

Figure 6:
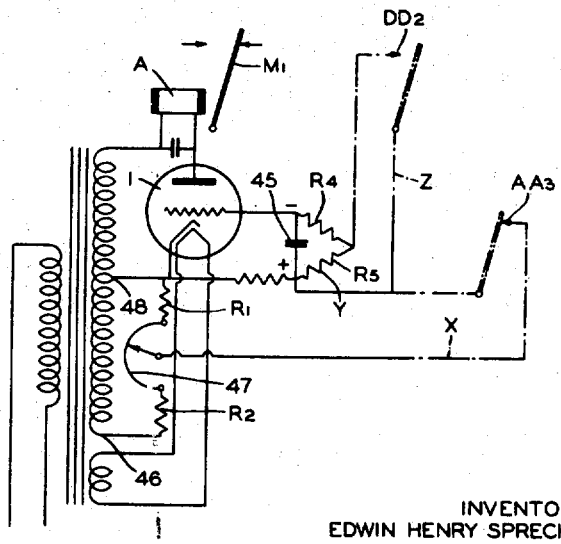
Fig. 6 is a detail diagram, on a larger scale, showing the circuits for a typical electronic measuring device.

The other four tubes, 1 to 4 inclusive, are generally alike, one typical tube (e. g. tube 1) being illustrated on a larger scale in Fig. 6. Similarly to tube 5, each of these tubes is energized by the secondary of a transformer, the primary of which is connected to $L_1$, $L_2$. Each tube includes a condenser and resistor connected in the grid circuit to produce and control a time delay in the firing of the tube after the charging circuit to the condenser is opened. The arrangement is similar to that followed in regular standard vacuum-tube time-delay relays, with exceptions now to be noted. The capacitor 45 shown in the grid circuit is charged with the polarity indicated and to the peak of the voltage from the central terminal of the transformer to resistor $R_2$. The current for charging capacitor 45 flows from terminal 46 through resistor $R_2$, through potentiometer 47 to its slider, thence through normally closed switch contacts (here marked $AA_3$) of a relay AA shown in Fig. 5, thence through capacitor 45 to the grid, and thence to the cathode of the tube, and to the center terminal 48 of the transformer, during the half cycles when terminal 46 is positive with respect to terminal 48. This charging circuit, it will be observed, includes but a single switch $AA_3$, which is true of all of the first four tubes. The grid and cathode elements of the tube in this instance function as a rectifier in which the grid acts as an anode.

The voltage applied to the grid of the tube consists of two parts, to wit, the A. C. voltage from terminal 46 to resistor $R_2$ and to the slider of the potentiometer 47, and also the D. C. voltage across capacitor 45. If the D. C. voltage in the grid circuit is greater than the A. C. voltage in the grid circuit, the tube is blocked and does not pass current. However, as soon as the charging circuit to the condenser is opened, as at switch $AA_3$, the D. C. voltage immediately starts to decrease, because capacitor 45 now discharges into and through resistors $R_4$ and $R_5$. After a definite time interval, the tube becomes unblocked and passes sufficient current to energize the coil of relay A, in this typical instance.

Recharging of the capacitor 45 occurs when the normally closed switch contacts $AA_3$ (now open) are again closed to their normal position.

The length of timing may be varied by adjustment of the potentiometer 47.

Still referring to the four like tubes 1, 2, 3 and 4, as typically illustrated for tube 1 in the circuit, Fig. 6, it will be noted that the resistance $R_5$ is shunted by a circuit including a normally open switch, here marked $DD_2$. If this switch is open when capacitor 45 begins to discharge, then the discharge is through both resistors $R_4$, $R_5$; but if or when such switch is closed, then the discharge is through only one of said resistors, $R_4$. When the discharge is through $R_4$ alone, the length of time delay then occurring is proportional to the ratio of resistance $R_4$ to the earlier total of resistances $R_4$ and $R_5$. The consequent accelerated rate of condenser discharge is utilized in the present system.

Thus, summing up, it will be observed that in each of the tubes 1 to 4 inclusive, the condenser 45 is controlled by three circuits, to wit, the charging circuit, including switch $AA_3$, before referred to, which may be characterized as circuit X, the primary or first discharge circuit, including both of resistors $R_4$, $R_5$, which may be characterized as circuit Y, and the secondary or accelerated discharge circuit, including switch $DD_2$ and resistor $R_4$ alone, and which may be characterized as circuit Z.

Still referring to the typical tube 1 and its related circuit elements, when such tube is unblocked and passes sufficient current to energize its relay coil (A in this instance) the effect is to actuate a controlling switch $M_1$. Corresponding switches for the other three tubes are marked $M_2$, $M_3$ and $M_4$.

Switch $M_1$ is a single pole double throw switch with two contacts $A_1$, $A_2$.

Switch $M_2$ is a double pole double throw switch with four contacts $B_1$, $B_2$, $B_3$, $B_4$.

Switch $M_3$ is also a double pole double throw switch with four contacts $C_1$, $C_2$, $C_3$, $C_4$.

Switch $M_4$ is a similar switch with contacts $D_1$, $D_2$, $D_3$, $D_4$.

Incidentally, it may also be observed that the relay coil E of tube 5 actuates a similar double pole double throw switch $M_5$, having four contacts $E_1$, $E_2$, $E_3$ and $E_4$.

The movable right-hand blade of each of the five switches $M_1$ to $M_5$ inclusive is connected, by conductors, to $L_1$, as shown. Where the switches have a second or left blade (all except $M_1$) the second blade receives its supply through other conductors to be later referred to.

Cooperating with the four tubes are four controlling relay coils marked respectively AA, BB, CC and DD, each provided with a series of contacts which it actuates and controls.

For example, relay AA is provided with normally open contacts $AA_1$, $AA_2$ and $AA_4$ and normally closed contacts $AA_3$ and $AA_5$.

Relay coil BB controls normally open contacts $BB_1$, $BB_2$ and $BB_4$ and normally closed contacts $BB_3$ and $BB_5$.

Relay coil CC actuates normally open contacts $CC_1$, $CC_2$, $CC_3$ and normally closed contacts $CC_4$.

Relay coil DD actuates normally open contacts $DD_1$, $DD_2$, $DD_3$ and $DD_4$ and normally closed contacts $DD_5$.

Tubes Nos. 1 and 2 work in conjunction with each other, or as a set or pair, to accomplish measuring for and cause the first and second folds of the same article, while tubes 3 and 4 work in conjunction with each other, as a set or pair, to accomplish like service for the first and second folds of an article following the first article. In other words, the two sets are used alternately, and the control system is arranged to so operate them.

The timing to be provided by tubes Nos. 1 and 3, for the first fold, is the same, so that the capacities and resistances are chosen and adjusted alike for these two tubes. The timing to be provided by tubes Nos. 2 and 4 is also to be the same, but differing from that provided by tubes 1 and 3, so that the capacities and resistances for these two tubes are chosen and adjusted alike, but usually to different values from those for tubes 1 and 2.

Figure 7:
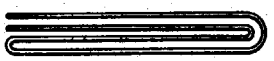
Fig. 7 is an end view of an article completely folded by the present machine.

A detailed description of the various circuits involved, during folding operations, will clarify the purposes of the various sets of tubes, relays and other controlling devices, as follows:

Let us assume that the system has been designed to fold sheets with a maximum length of ninety-four inches and that the capacities and resistances have been adjusted to produce folds at the quarter and half points. In other words, assuming the folding bar 15 in the position shown in Fig. 1 the sheet will advance until approximately twenty-five per cent of it, or one-quarter, hangs below the folding blade 20, whereupon a folding operation occurs in the sense that solenoid 26 is energized to cause the arm 15 to advance, away from the folding rolls 21, to its outermost position, the sheet thereupon falling or draping in front of the blade in a double loop. Advance of the sheet continues until approximately the three-quarter point of the sheet has reached the level of the folding blade, whereupon the trip solenoid 26 is again energized and the folding blade returns to its original position, thus advancing the sheet, now draped or divided into four plies or layers, as shown in Fig. 7, into the bite of the folding rolls, between which it passes, thus completing one folding operation. The folding operation therefore requires two movements of the folding arm and bar.

At the beginning of a day, or whenever starting the machine into operation, all circuits are open and all tubes, capacitors and coils are deenergized. Switches 41, 41a should be in the positions shown in Fig. 5. If not, they will immediately assume that position, by an idle half revolution cycle, when the main switch 49 is closed, as will later appear. But in any event, closure of the main switch immediately energizes the several tube filaments and closes the several charging circuits to charge the capacitor 45 for each thereof.

Now, when the leading edge of a sheet engages the trip 43, tube No. 5 fires immediately. That is to say, it becomes unblocked and passes current to the relay E, which thereupon actuates the switch $M_5$, moving its blades from the position shown, on contacts $E_2$ and $E_4$, to its other contacts $E_1$ and $E_3$.

The only effect, at switch $M_5$, is to complete a circuit from $L_1$ to the contact $E_3$, then through a blade of switch $M_2$ to and through relay coil AA to contacts $AA_4$, but not through them, thence through the normally closed contacts $DD_5$ of relay DD to $L_2$. Relay AA is thereby energized. A maintaining circuit for relay AA is immediately established from $L_1$ through a blade of relay B to its contact $B_4$, thence through the normally open contacts $AA_1$ of relay AA (now closed), thence through the coil of relay AA, and on as before.

Relay AA moves its several sets of contacts to their second positions, with two effects.

First, the charging circuit X for tube 1 is opened at contacts $AA_3$, and the capacitor for said tube begins to discharge through its primary discharge circuit Y.

Second, the charging circuit X for tube 2 is opened at contacts $AA_5$, and the primary discharge circuit Y for its capacitor becomes operative.

In order to accomplish the first fold in the article it is necessary to energize the clutch trip solenoid 26 to produce motion of the folding arm and blade, and since this action is to occur at the quarter point, or, in other words, at a point proportional to the length of the article, but regardless of its actual length, it is necessary to take the actual length of the article into account. This is accomplished by the passage of the trailing edge of the sheet past the trip contact 43 enabling it to close.

If the sheet is of the maximum length which the tubes will take care of at the chosen capacities and resistances, and adjustments thereof, then the capacity 45 for tube 1 will become fully discharged at the time the trailing edge of the sheet permits switch 43 to close, and tube 1 will fire without any acceleration of the rate of discharge of its condenser. But that situation is not frequent. Usually some acceleration of the rate of discharge is necessary. In other words, the trailing edge of the sheet will permit trip contact 43 to close before the condenser 45 of tube 1 is fully discharged. The effect of closing of trip contact 43, in that event, is to again block the flow of current through tube 5, deenergizing its relay coil E, and permitting its switch $M_5$ to return to its original position.

One effect is to open the initial energizing circuit for relay AA at contacts $E_3$. Another effect is to establish a circuit as follows:

From $L_1$ through the right-hand blade of switch $M_5$ to contact $E_4$, thence through the normally open but now closed contacts $AA_2$ of relay AA, thence through the coil of relay DD to $L_2$, thus energizing relay DD and moving its several contacts to their second positions, from the positions shown.

A maintaining circuit for relay DD is immediately established as follows:

From $L_1$ through the normally open contacts (now closed) $DD_4$ of relay DD, through the normally closed contact $CC_4$ of relay CC, and thence through the coil of relay DD. Thus, coil DD is and remains energized.

Energization of coil DD has three effects. First, it opens the initial energizing circuit for relay AA at normally closed contacts $DD_5$. Second, it closes normally open contacts $DD_2$, $DD_3$, which, respectively, are in the secondary or accelerating circuits Z for the condensers 45 of tubes 1 and 2. Third, it prepares the initiating circuit for energizing relay BB by closure of contacts $DD_1$, thus preparing the second set of tubes 3, 4 for use in measuring a second article.

When the article is of maximum length, as stated, the effect is felt at tube 1 at the same instant that its condenser becomes fully discharged, so that there is no real accelerated rate of discharge and the tube 1 fires immediately. But when the article is of shorter length, the rate of discharge is accelerated at the instant the trailing edge of the sheet passes the trip contact 43 and the tube fires after condenser discharge is completed at the end of the period of accelerated discharge.

In either case, upon firing of tube 1, switch $M_1$ is moved from the position shown, on contact $A_2$ to contact $A_1$. This completes a circuit as follows:

From $L_1$ through the blade of switch $M_1$ to contact $A_1$, thence through the drum clutch trip contact 41a (now in closed position) and through clutch trip solenoid 26 to $L_2$.

Energization of the clutch trip solenoid closes the clutch in the manner before described and starts a half cycle operation of shaft 18, which is completed, even though the switch 41a almost immediately opens.

During half revolution of shaft 18 the folding arm and blade are advanced to a position away from the folding rolls. The first draping or folding operation terminates when the arm reaches its outermost position and the shaft has rotated 180°. As it terminates, switch 41 closes, but without electrical effect.

Discharge of the condenser 45 of tube 2 is still going on, but at the accelerated rate, because its accelerating circuit Z is closed at the contacts $DD_3$ of switch DD. When that condenser is completely discharged, tube 2 fires with effects as follows:

Coil B is energized, actuating the switch $M_2$, thus moving its right-hand blade from its position shown, on contact $B_4$, to its other position on contact $B_3$, thus establishing a circuit as follows:

From $L_1$, through the right-hand blade of switch $M_2$, to contact $B_3$, thence through the drum driven switch 41 (now closed), and through the clutch trip solenoid 26 to $L_2$.

The effect is to again cause actuation of the clutch, and half revolution of the shaft 18 and other parts, returning them to their original positions. This operation is accompanied by return of the folding arm 15 and blade 20 to their original positions, feeding the article to the bite of the folding rollers, where it is pressed into the form shown in Fig. 6, thus completing fold of this article.

Energization of coil B also opens the circuit through switch $M_2$ to its contact $B_4$, thus deenergizing relay AA and reestablishing the charging circuits X for tubes 1 and 2.

Tubes 3 and 4 function to produce the first and second folds in a second closely following article in exactly the same manner as tubes 1 and 2, without further description. In extreme cases, where three very short articles might follow in close succession, three sets of tubes and relays might be employed. But the arrangement shown provides but two sets.

The reason for using a duplicate or second set of tubes and relays is to prevent interference with the already established functions of the tubes of the first set, when a closely following second article engages the sheet contact 43 before the folding operations on the first article have been completed. The arrangement and operation to that end will now be described.

Again assuming that a full length ninety-four inch article has just passed the sheet contact 43, and that a second article is following closely behind, it can be appreciated that the second article will interrupt the sheet contact and would interfere with the accelerated rate of discharge of the capacitor 45 on the tube 2, unless some means is provided to prevent such interference.

It will be noted that when the trailing edge of the first article passed trip 43 relay DD was energized, and its coil then was maintained energized through its own normally open contacts $DD_4$ (now closed) and the normally closed contact $CC_4$ of relay CC. Also, when relay DD is energized, the initiating circuit for energizing relay AA is opened at contacts $DD_5$, and the initiating circuit, for setting tubes 3 and 4 into operation, is preliminarily prepared at contacts $DD_1$.

Now when the sheet contact 43 is opened by the leading edge of a closeily following article, circuits are established as follows:

From $L_1$ now through the left-hand blade of switch $M_5$ (now in its second position) to contact $E_1$, thence through normally closed contacts $D_2$ of relay D, thence to but not through the contact $BB_1$ of relay BB, through the coil of relay BB, thence through the normally open contacts $DD_1$ of relay DD (now closed), to $L_2$. This closes relay BB. The maintaining circuit for relay BB is now established from $L_1$ through the right-hand blade of switch $M_4$ of relay D to its contact $D_4$, through the normally open contacts $BB_1$ of relay BB (now closed), next through the coil of relay BB, and so on as before.

Energization of relay BB opens the charging circuit X to capacitor 45 of tube 3, by opening the normally closed contacts $BB_3$ of relay BB. This terminates charge of the capacitor 45 of tube 3 and initiates discharge of said capacitor through its primary charging circuit Y, including resistances $R_{14}$ and $R_{15}$.

At the same time the charging circuit to the capacitor 45 of tube 4 is opened by opening a second set of normally closed contacts $BB_5$ of relay BB, in the charging circuit X for tube 4. This starts the discharge of capacitor 45 of tube 4 through its primary discharging circuit Y, including resistors $R_{19}$ and $R_{20}$.

When the trailing edge of the second article leaves the sheet contact 43, such contact again closes, which deenergizes relay E with results as follows:

First, the initial circuit for energizing relay BB is opened at contact $E_1$. Second, relay CC is energized by a circuit as follows:

From $L_1$ through the left-hand blade of switch $M_5$ to its contacts $E_2$, thence through the normally open contacts $BB_2$ of relay BB (now closed), through the coil of relay CC to $L_2$. A maintaining circuit for relay CC is immediately established as follows:

From $L_1$ through the normally open contact $CC_1$ of relay CC (now closed) through the normally open contacts $BB_2$ of relay BB (now closed) and through the coil of relay CC to $L_2$.

Energization of relay CC closes its normally open contacts and thus completes the accelerated discharge circuits Z of tubes 3 and 4, by short circuiting the resistances $R_{15}$ and $R_{20}$ of the condensers of such tubes. It also opens normally closed contacts $CC_4$ in the initiating circuit for energizing relay BB.

As in the case of tubes Nos. 1 and 2, accelerated rate of discharge at tubes 3 and 4 is different, producing firing operation of said tubes successively, tube 3 to produce the first drape or fold and tube 4 to produce the second drape or fold. The operation of producing these folds, as the result of firing of tubes 3 and 4 is exactly the same as with tubes 1 and 2, and requires no detailed description.

Speaking generally, the purposes of certain of the elements of the control system described may be stated as follows:

Clutch trip contacts or switches 41, 41a are closed alternately at the ends of each of a series of half cycle operations. These two switches, acting in concert because of their operation from a single cam on shaft 18, serve to produce the appropriate direction of motion of the folding or draping arm 15. When one of them is closed the arm advances, and when the other is closed it is retracted, and that is true regardless of whether the particular folding operations are being produced or controlled by the first set of tubes 1 and 2, or the second set, 3 and 4.

Switch $M_5$, controlled by tube 5 and sheet contacts 43, is really a double switch, or, in other words, two switches coupled together for simultaneous actuation by coil E. Each of the blades of said switch can produce two folding operations, the first by advance to its second contact and the second by return to its first contact. However, only one of the blades or members of this double switch is effective at any particular time.

The coil DD and two of its sets of contacts, normally open contacts $DD_1$ and normally closed contacts $DD_5$, in cooperation with switch $M_5$, serves as a selector mechanism or means for determining which pair of tubes 1 and 2 or 3 and 4, is put into operation for the folding of a given article. Whether switch $DD_1$ is open and $DD_5$ closed, or $DD_1$ is closed and $DD_5$ open, depends upon whether relay DD is deenergized or energized. Because contacts $DD_5$ are in the initiating circuit for energizing relay AA and contacts $DD_1$ in the initiating circuit for energizing relay BB, the relays AA and BB, respectively, set into operation either the first set of tubes 1 and 2 or the second set of tubes 3 and 4. Thus, if coil DD is deenergized the right-hand blade of switch $M_5$, is effective, through normally closed contacts $DD_5$, to energize relay AA when that blade is advanced to contact $E_3$. Thereupon relay AA opens the charging circuits of tubes 1 and 2 and subsequently energization of relay DD initiates accelerated rate of condenser discharge, at the same time reversing the positions of the contacts $DD_1$, $DD_5$.

Then, a second or following article, causing actuation of switch $M_5$, becomes operative through its left-hand blade, which now initiates energization of relay BB, by its engagement with contact $E_1$. Later relay CC initiates the accelerated rate of discharge for the condensers of the second pair of tubes 3, 4. Even if the successive articles are spaced widely apart, the two pairs of tubes 1, 2 and 3, 4 are put into operation successively or in turn. That is because completion of the folds on the first article leaves the relay DD energized, with the left-hand blade of switch $M_5$ alone effective to initiate tube operation, a condition which persists so long as the main switch remains closed. Therefore, a second article is always measured by the second set of tubes, unless in the meantime the main switch has been opened or relay DD has otherwise been deenergized.

It should be noted that if at any time the machine is started when the switches 41, 41a are in the wrong positions, or out of phase, i. e., with switch 41 closed and 41a open, as might occur if the machine is stopped at the end of the wrong half cycle, with the folding arm away from instead of close to the folding rolls, the first effect of closing main switch 49 is to put them in phase. In such case, current flows from $L_1$ to blade and contacts $A_2$ of switch $M_1$, thence through the left-hand blade of switch $M_3$ to its contacts $C_2$, thence through switch 41 to clutch trip coil 26 and to $L_2$, initiating a half revolution cycle of the clutch and cam mechanism and advancing or returning the folding blade to its proper position.

Thus, in conclusion, the present invention may be summarized as follows:

The means which performs an operation upon each of a series of articles fed or traveling along a path, is here typified by the draping or folding arm 15 and its blade 20, each movement of which produces a fold in an article. That means, whatever its form, is here actuated to perform two operations upon the article at different points located upon it proportionately to its length, regardless of its actual length.

Performance of the operations is controlled by two governing units each arranged to accomplish measurement of the article and to cause actuation of the operation performing means.

Operations of the two units referred to are controlled by a single trip device, here typified by the trip contacts 43, which in turn actuate a primary selector means, such as the relay E and the switch $M_5$ actuated by it. This selector means, by its operation as a consequence of the passage of one article past the trip device, selects one or the other of the two units as the immediate controller for the operation performing means. Its operation to that end is determined by a secondary selector means, to wit, the relay DD and its normally open contacts $DD_1$ and normally closed contacts $DD_5$. That is to say, each time the primary selector means is operated it not only chooses or selects one of the units as the immediate controller for the operation performing means, but it also adjusts the secondary selector means, as the result of actuation of the trip device by passage of the trailing edge of an article past it, so that, the next time the primary selector means is operated, it now selects another of the units, specifically the second one in the form shown and described. The secondary selector means hence is operated by the first but is also sensitive to passage of the trailing edge of an article past the trip device 43.

The system described prevents interference by a following article with measuring of the next preceding article or performance of an operation thereon. Nevertheless it involves but a single trip and consequently makes the entire machine shorter than when two trips, spaced along the path of article movement, are employed. The mechanism is readily adjusted for measurement of the articles in any desired proportions and is accurate in the performance of its duty.

Further advantages of the invention will be apparent to those skilled in the art.

What I claim is:

1. In apparatus of the type in which operating means performs an operation, proportionate to article length, upon each of a series of articles fed in succession along a path, improved controlling means for said operating means, comprising a plurality of article measuring units, each capable of independently performing a measuring operation, each operatively associated with said operating means to control and cause actuation thereof, a single trip device cooperating therewith and so located as to be sensitive to travel of an article along said path, movable selector means controlled by said trip device and operatively connected to said measuring units and adapted by its movement to cause one of said units in cooperation with said trip device to first measure an article and then to cause actuation of said operating means, and a controller also sensitive to travel of an article along said path for designating which of said units becomes operative upon operating movement of said selector means in response to the next following article.

2. In apparatus of the type in which operating means performs an operation, proportionate to article length, upon each of a series of articles fed in succession along a path, improved controlling means for said operating means, comprising a plurality of article measuring units, each capable of independently performing a measuring operation, each operatively associated with said operating means to control and cause actuation thereof, a single trip device cooperating therewith and so located as to be sensitive to travel of an article along said path, and movable selector means controlled by said trip device and operatively connected to said measuring units and adapted by its movement to cause one of said units in cooperation with said trip device to first measure an article and then to cause actuation of said operating means to perform an operation, each of said units including means for causing separate actuations of said operating means at different points spaced apart upon the article.

3. In apparatus of the type in which an operating means performs an operation, proportionate to article length, upon each of a series of articles fed in succession along a path, improved controlling means for said operating means, comprising a plurality of article measuring units, each capable of independently performing a measuring operation, each operatively associated with said operating means to control and cause actuation thereof, a single trip device cooperating therewith and so located as to be sensitive to travel of an article along said path, movable selector means controlled by said trip device and operatively connected to said measuring units and adapted by its movement to cause one of said units in cooperation with said trip device to first measure one article and then to cause actuation of said operating means to perform an operation, and means whereby movement of said selector means to cause operation of one of said units with respect to said one article causes said selector means to become effective upon another unit when the next following article affects the trip device, each of said units including means for causing separate actuations of said operating means at different points spaced apart upon the article.

4. In apparatus of the type in which operating means performs an operation, proportionate to article length, upon each of a series of articles fed in succession along a path, improved controlling means for said operating means, comprising a plurality of article measuring units, each capable of independently performing a measuring operation, each operatively associated with said operating means to control and cause actuation thereof, a single trip device cooperating therewith and so located as to be sensitive to travel of an article along said path, movable selector means controlled by said trip device and operatively connected to said measuring units and adapted by its movement to cause one of said units in cooperation with said trip device to first measure an article and then to cause actuation of said operating means, and a controller also sensitive to travel of an article along said path for designating which of said units becomes operative upon operating movement of said selector means in response to the next following article, each of said units including means for causing separate actuations of said operating means at different points spaced apart upon the article.

5. In apparatus of the type in which operating means performs an operation, proportionate to article length, upon each of a series of articles fed in succession along a path, improved controlling means for said operating means, comprising a plurality of article measuring units, each capable of independently performing a measuring operation, each operatively associated with said operating means to control and cause actuation thereof, a single trip device cooperating therewith and so located as to be sensitive to travel of an article along said path, and selector means controlled by said trip device and having two-step movement, one step produced by movement of the leading edge and the other step by movement of trailing edge of an article past the trip device, the first step initiating operation of one of said units and the second adjusting said unit in proportion to article length, to thereby measure each article and produce an operation upon it in proportion to its length.

6. In apparatus of the type in which operating means performs two operations, both proportionate, but in different ratios, with respect to article length, upon each of a series of articles fed in succession along a path, improved controlling means for said operating means, comprising a plurality of article measuring units, each capable of independently performing a measuring operation, each unit including two controlling members independently effective upon said operating means to cause two actuations thereof, one for each ratio of article length, a single trip device sensitive to travel of an article along said path, and selector means controlled by said trip device and having two-step movement, one step produced by movement of the leading edge and the other step by movement of the trailing edge of an article past the trip device, the first step initiating operation of one of said units and the second adjusting both of the members of said unit in different proportions to article length.

7. In apparatus of the type in which operating means performs two operations, both proportionate, but in different ratios, with respect to article length, upon each of a series of aricles fed in succession along a path, improved controlling means for said operating means, comprising a plurality of article measuring units, each capable of independently performing a measuring operation, each unit including two controlling members independently effective upon said operating means to cause two actuations thereof, one for each ratio of article length, a single trip device sensitive to travel of an article along said path, selector means controlled by said trip device and having two-step movement, one step produced by movement of the leading edge and the other step by movement of the trailing edge of an article past the trip device, the first step initiating operation of one of said units and the second adjusting both of the members of said unit in different proportions to article length, and a controller also sensitive to travel of an article past said trip for designaing which of said units becomes operative upon operating movement of said selector means in response to the next succeeding article.

8. In apparatus of the type in which operating means performs two operations, both proportionate, but in different ratios, with respect to article length, upon each of a series of articles fed in succession along a path, improved controlling means for said operating means, comprising a plurality of article measuring units, each capable of independently performing a measuring operation, each unit including two controlling members independently effective upon said operating means to cause two actuations thereof, one for each ratio of article length, a single trip device sensitive to travel of an article along said path, selector means controlled by said trip device and having two-step movement, one step produced by movement of the leading edge and the other step by movement of the trailing edge of an article past the trip device, the first step initiating operation of one of said units and the second adjusting both of the members of said unit in different proportions to article length, and a controller sensitive to the second step of movement of said selector means upon passage of one article past said trip for designating which of said units becomes operative upon operating movement of said selector means in response to the next succeeeding article passing said trip.

9. In apparatus of the type in which operating means performs an operation, proportionate to article length, upon each of a series of articles fed in succession along along a path, improved controlling means for said operating means, comprising a plurality of article measuring units, each capable of independently performing a measuring operation, each operatively associated with said operating means to control and cause actuation thereof, a single trip device cooperating therewith and so located as to be sensitive to travel of an aricle along said path, primary movable selector means controlled by said trip device and operatively connected to one of said measuring units and adapted by its movement to cause one of said units in cooperation with said trip device to first measure an article and then to cause actuation of said operating means to perform an operation, and secondary selector means rendered effective by each operation of said primary selector means for operatively connecting the latter to another measuring unit.

10. A timing device for use with an apparatus of the type wherein a series of articles is fed in succession along a path, and an operating means performs an operation proportionate to article length on each article, and wherein said apparatus has a single trip located adjacent said path so as to be sensitive to and responsive to travel of said articles therepast, said timing device comprising controlling means for said operating means including a plurality of article-measuring units, each capable of independently performing a measuring operation, an actuating switch operatively responsive to operation of said trip, selector means operatively responsive to respective positions of said actuating switch for designating which of said units becomes operable in response to actuation of said trip by the next article, and means operatively connecting each of said units with said operating means.

11. A timing device for use with an apparatus of the type wherein a series of articles is fed in succession along a path, and an operating means performs an operation proportionate to article length on each article, and wherein said apparatus has a single trip located adjacent said path so as to be sensitive to and responsive to travel of said articles therepast, said timing device comprising controlling means for said operating means including a plurality of article-measuring units, each capable of independently performing a measuring operation, an actuating switch, said actuating switch having a plurality of operating positions, a selector means for designating which one of said article-measuring units becomes operable in response to actuation of said trip by an article in the series, operative connections between said trip and said actuating switch, operative connections between said actuating switch and said selector means, operative connections between said selector means and each of said article measuring units, and operative connections between each of said article measuring units and said operating means.

12. A timing device for use with an apparatus of the type wherein a series of articles is fed in succession along a path, and an operating means performs an operation proportionate to article length on each article, and wherein said apparatus has article sensitive means located adjacent said path so as to be sensitive to and responsive to travel of said articles therepast, said timing device comprising controlling means for said operating means including a plurality of article-measuring units, each capable of independently performing a measuring operation, an actuating switch, a selector for designating which one of said article-measuring units becomes operable in response to actuation of said article-sensitive means by an article in the series, operative connections between said article-sensitive means and said actuating switch, operative connections between said actuating switch and said selector means, operative connections between said selector means and each of said article-measuring units, and operative connections between each of said article-measuring units and said operating means.

13. A timing device for use with an apparatus of the type wherein a series of articles is fed in succession along a path, and an operating means performs an operation proportionate to article length on each article, and wherein said apparatus has article-sensitive means located adjacent said path so as to be sensitive to and responsive to travel of said articles therepast, said timing device comprising controlling means for said operating means including a plurality of article-measuring units, each capable of independently performing a measuring operation, a first selector consisting of a switch movable to any one of several positions, a second selector for designating which one of said article-measuring units becomes operable in response to actuation of said article-sensitive means by an article in the series, operative connections between said article-sensitive means and said first selector, operative connections between said first selector and said second selector, operative connections between said second selector and each of said article-measuring units, and operative connections between each of said article-measuring units and said operating means.

14. A timing device for use with an apparatus of the type wherein a series of articles is fed in succession along a path, and an operating means performs an operation proportionate to article length on each article, and wherein said apparatus has a single trip located adjacent said path so as to be sensitive to and responsive to travel of said articles therepast, said timing device comprising controlling means for said operating means including a plurality of article-measuring units, each capable of independently performing a measuring operation, an actuating switch operatively responsive to operation of said trip, selector means operatively responsive to operation of said actuating switch for designating which of said units becomes operable in response to actuation of said trip by the next article, and means operatively connecting each of said units with said operating means.

15. A timing device for use with an apparatus of the type wherein a series of articles is fed in succession along a path, and an operating means performs an operation proportionate to article length on each article, and wherein said apparatus has article sensitive means located adjacent said path so as to be sensitive to and responsive to travel of said articles therepast, said timing device comprising controlling means for said operating means including a plurality of article-measuring units, each capable of independently performing a measuring operation, a first selector consisting of a switch, a second selector for designating which one of said article-measuring units becomes operable in response to actuation of said article-sensitive means by an article in the series, operative connections between said article-sensitive means and said first selector, operative connections between said first selector and said second selector, operative connections between said second selector and each of said article-measuring units, and operative connections between each of said article-measuring units and said operating means.

*16. In apparatus of the type in which operating means performs an operation, proportionate to article length, upon each of a series of articles fed in succession along a path, improved controlling means for said operating means, comprising a plurality of article measuring units, each unit having respective proportional and full speed measuring means whereby each unit is individually capable of performing a measuring operation, each unit being operatively associated with said operating means to control and cause operation thereof, a single trip device cooperating therewith and so located as to be sensitive to travel of an article along said path, movable actuating means controlled by said trip device and operatively connected to said measuring units and adapted by its movement to cause one of said units in cooperation with said trip device to first measure an article and then to cause operation of said operating means, and a selector also sensitive to travel of an article along said path for designating which of said units becomes operative upon operating movement of said actuating means in response to the next following article.*

*17. In apparatus of the type in which operating means performs an operation, proportionate to article length, upon each of a series of articles fed in succession along a path, improved controlling means for said operating means, comprising a plurality of article measuring units, each unit having respective proportional and full speed measuring means whereby each unit is individually capable of performing a measuring operation, each unit being operatively associated with said operating means to control and cause operation thereof, a single trip device cooperating therewith and so located as to be sensitive to travel of an article along said path, and movable actuating means*

*controlled by said trip device and operatively connected to said measuring units and adapted by its movement to cause one of said units in cooperation with said trip device to first measure an article and then to cause operation of said operating means to perform an operation, each of said units including means for causing separate operations of said operating means at different points spaced apart upon the article.*

*18. In apparatus of the type in which an operating means performs an operation, proportionate to article length, upon each of a series of articles fed in succession along a path, improved controlling means for said operating means, comprising a plurality of article measuring units, each unit having respective proportional and full speed measuring means whereby each unit is individually capable of performing a measuring operation, each unit being operatively associated with said operating means to control and cause operation thereof, a single trip device cooperating therewith and so located as to be sensitive to travel of an article along said path, movable actuating means controlled by said trip device and operatively connected to said measuring units and adapted by its movement to cause one of said units in cooperation with said trip device to first measure one article and then to cause operation of said operating means to perform an operation, and selector means responsive to said actuating means so as to cause operation of one of said units with respect to said one article, and subsequently causes said actuating means to become effective upon another unit when the next following article affects the trip device, each of said units including means for causing separate operations of said operating means at different points spaced apart upon the article.*

*19. In apparatus of the type in which operating means performs an operation, proportionate to article length, upon each of a series of articles fed in succession along a path, improved controlling means for said operating means, comprising a plurality of article measuring units, each unit having respective proportional and full speed measuring means whereby each unit is individually capable of performing a measuring operation, each unit being operatively associated with said operating means to control and cause operation thereof, a single trip device cooperating therewith and so located as to be sensitive to travel of an article along said path, movable actuating means controlled by said trip device and operatively connected to said measuring units and adapted by its movement to cause one of said units in cooperation with said trip device to first measure an article and then to cause operation of said operating means, and a selector also sensitive to travel of an article along said path for designating which of said units becomes operative upon operating movement of said actuating means in response to the next following article, each of said units including means for causing separate operations of said operating means at different points spaced apart upon the article.*

*20. In apparatus of the type in which operating means performs an operation, proportionate to article length, upon each of a series of articles fed in succession along a path, improved controlling means for said operating means, comprising a plurality of article measuring units, each unit having respective proportional and full speed measuring means whereby each unit is individually capable of performing a measuring operation, each unit being operatively associated with said operating means to control and cause operation thereof, a single trip device cooperating therewith and so located as to be sensitive to travel of an article along said path, and actuating means controlled by said trip device and having two-step movement, one step produced by movement of the leading edge and the other step by movement of the trailing edge of an article past the trip device, the first step initiating operation of one of said units and the second adjusting said unit in proportion to article length, to thereby measure each article and produce an operation upon it in proportion to its length.*

*21. In apparatus of the type in which operating means performs two operations, both proportionate, but in different ratios, with respect to article length, upon each of a series of articles fed in succession along a path, improved controlling means for said operating means, comprising a plurality of article measuring units, each unit having respective proportional and full speed measuring means whereby each unit is individually capable of performing a measuring operation, each unit including two controlling members independently effective upon said operating means to cause two operations thereof, one for each ratio of article length, a single strip device sensitive to travel of an article along said path, and actuating means controlled by said trip device and having two-step movement, one step produced by movement of the leading edge and the other step by movement of the trailing edge of an article past the trip device, the first step initiating operation of one of said units and the second adjusting both of the members of said unit in different proportions to article length.*

*22. In apparatus of the type in which operating means performs two operations, both proportionate, but in different ratios, with respect to article length, upon each of a series of articles fed in succession along a path, improved controlling means for said operating means, comprising a plurality of article measuring units, each unit having respective proportional and full speed measuring means whereby each unit is individually capable of performing a measuring operation, each unit including two controlling members independently effective upon said operating means to cause two actuations thereof, one for each ratio of article length, a single trip device sensitive to travel of an article along said path, actuating means controlled by said trip device and having two-step movement, one step produced by movement of the leading edge and the other step by movement of the trailing edge of an article past the trip device, the first step initiating operation of one of said units and the second adjusting both of the members of said unit in different proportions to article length, and a selector also sensitive to travel of an article past said trip for designating which of said units becomes operative upon operating movement of said actuating means in response to the next succeeding article.*

*23. In apparatus of the type in which operating means performs two operations, both proportionate, but in different ratios, with respect to article length, upon each of a series of articles fed in succession along a path, improved controlling means for said operating means, comprising a plurality of article measuring units, each unit having respective proportional and full speed measuring means whereby each unit is individually capable of performing a measuring operation, each unit including two controlling members independently effective upon said operating means to cause two operations thereof, one for each ratio of article length, a single trip device sensitive to travel of an article along said path, actuating means controlled by said trip device and having two-step movement, one step produced by movement of the leading edge and the other step by movement of the trailing edge of an article past the trip device, the first step intiating operation of one of said units and the second adjusting both of the members of said unit in different proportions to article length, and a selector sensitive to the second step of movement of said selector means upon passage of one article past said trip for designating which of said units becomes operative upon operating movement of said actuating means in response to the next succeeding article passing said trip.*

*24. In apparatus of the type in which operating means performs an operation, proportionate to article length, upon each of a series of articles fed in succession along a path, improved controlling means for said operating means, comprising a plurality of article measuring units, each unit having respective proportional and full speed*

*measuring means whereby each unit is individually capable of performing a measuring operation, each operatively associated with said operating means to control and cause operation thereof, a single trip device cooperating therewith and so located as to be sensitive to travel of an article along said path, primary movable means controlled by said trip device and operatively connected to one of said measuring units and adapted by its movement to cause one of said units in cooperation with said trip device to first measure an article and then to cause operation of said operating means to perform an operation, and selector means rendered effective by each operation of said primary movable means for operatively connecting the latter to another measuring unit.*

*25. A timing device for use with an apparatus of the type wherein a series of articles is fed in succession along a path, and an operating means performs an operation proportionate to article length on each article, and wherein said apparatus has a single trip located adjacent said path so as to be sensitive to and responsive to travel of said articles therepast, said timing device comprising controlling means for said operating means including a plurality of article-measuring units, each unit having respective proportional and full speed measuring means whereby each unit is individually capable of performing a measuring operation, an actuating switch operatively responsive to operation of said trip, selector means operatively responsive to respective positions of said actuating switch for designating which of said units becomes operable in response to actuation of said trip by the next article, and means operatively connecting each of said units with said operating means.*

*26. A timing device for use with an apparatus of the type wherein a series of articles is fed in succession along a path, and an operating means performs an operation proportionate to article length on each article, and wherein said apparatus has a single trip located adjacent said path so as to be sensitive to and responsive to travel of said articles therepast, said timing device comprising controlling means for said operating means including a plurality of article-measuring units, each unit having respective proportional and full speed measuring means whereby each unit is individually capable of performing a measuring operation, an actuating switch, said actuating switch having a plurality of operating positions, a selector means for designating which one of said article-measuring units becomes operable in response to actuation of said trip by an article in the series, operative connections between said trip and said actuating switch, operative connections between said actuating switch and said selector means, operative connections between said selector means and each of said article measuring units, and operative connections between each of said article measuring units and said operating means.*

*27. A timing device for use with an apparatus of the type wherein a series of articles is fed in succession along a path, and an operating means performs an operation proportionate to article length on each article, and wherein said apparatus has article sensitive means located adjacent said path so as to be sensitive to and responsive to travel of said articles therepast, said timing device comprising controlling means for said operating means including a plurality of article-measuring units, each unit having respective proportional and full speed measuring means whereby each unit is individually capable of performing a measuring operation, an actuating switch, a selector for designating which one of said article-measuring units becomes operable in response to actuation of said article-sensitive means by an article in the series, operative connections between said article-sensitive means and said actuating switch, operative connections between said actuating switch and said selector means, operative connections between said selector means and each of said article-measuring units, and operative connections between each of said article-measuring units and said operating means.*

*28. A timing device for use with an apparatus of the type wherein a series of articles is fed in succession along a path, and an operating means performs an operation proportionate to article length on each article, and wherein said apparatus has article-sensitive means located adjacent said path so as to be sensitive to and responsive to travel of said articles therepast, said timing device comprising controlling means for said operating means including a plurality of article-measuring units, each unit having respective proportional and full speed measuring means whereby each unit is individually capable of performing a measuring operation, an actuator consisting of a switch movable to any one of several positions, a selector for designating which one of said article-measuring units becomes operable in response to actuation of said article-sensitive means by an article in the series, operative connections between said article-sensitive means and said actuator, operative connections between said actuator and said selector, operative connections between said selector and each of said article-measuring units, and operative connections between each of said article-measuring units and said operating means.*

*29. A timing device for use with an apparatus of the type wherein a series of articles is fed in succession along a path, and an operating means performs an operation proportionate to article length on each article, and wherein said apparatus has a single trip located adjacent said path so as to be sensitive to and responsive to travel of said articles therepast, said timing device comprising controlling means for said operating means including a plurality of article-measuring units, each unit having respective proportional and full speed measuring means whereby each unit is individually capable of performing a measuring operation, an actuating switch operatively responsive to operation of said trip, selector means operatively responsive to operation of said actuating switch for designating which of said units becomes operable in response to actuation of said trip by the next article, and means operatively connecting each of said units with said operating means.*

*30. A timing device for use with an apparatus of the type wherein a series of articles is fed in succession along a path, and an operating means performs an operation proportionate to article length on each article, and wherein said apparatus has article sensitive means located adjacent said path so as to be sensitive to and responsive to travel of said articles therepast, said timing device comprising controlling means for said operating means including a plurality of article-measuring units, each unit having respective proportional and full speed measuring means whereby each unit is individually capable of performing a measuring operation, a first selector consisting of a switch, a second selector for designating which one of said article-measuring units becomes operable in response to actuation of said article-sensitive means by an article in the series, operative connections between said article-sensitive means and said first selector, operative connections between said first selector and said second selector, operative connections between said second selector and each of said article-measuring units, and operative connections between each of said article-measuring units and said operating means.*

*31. A timing device for use with an apparatus of the type wherein a series of articles is fed in succession along a path, and an operating means performs an operation, proportionate to article length, on each article, and wherein said apparatus has a single trip located adjacent said path so as to be sensitive to and responsive to travel of said articles therepast, said timing device comprising controlling means for said operating means including a plurality of article measuring units, each unit consisting of an electronic tube and appropriate grid, plate, and cathode circuits in which passage of plate current is controlled by variation in grid potential, grid potential control means establishing the plate current cut-off point, an actuating*

*switch operatively responsive to operation of said trip and effective on said grid potential control means to permit passage of plate current, selector means operatively responsive to operation of said actuating switch for designating which of said units becomes operable in response to actuation of said trip by the next article, and means operatively connecting the plate circuit of each of said units with said operating means.*

*32. A timing device for use with an apparatus of the type wherein a series of articles is fed in succession along a path, and an operating means performs an operation, proportionate to article length, on each article, and wherein said apparatus has a single trip located adjacent said path so as to be sensitive to and responsive to the travel of said article therepast, said timing device comprising controlling means for said operating means including a plurality of article measuring units, each unit consisting of an electronic tube with appropriate grid, plate, and cathode circuits, and being adapted to pass plate current therethrough when the grid potential is suitably varied past the plate current cut-off point, means including a capacitor*

*which, when charged beyond said cut-off point interrupts said plate current, a capacitor discharge time delay circuit including resistor means for controlling the rate of capacitor discharge to said cut-off point, an actuating switch operatively responsive to operation of said trip and effective to close said capacitor discharge circuit, selector means operatively responsive to operation of said actuating switch for designating which of said units becomes operable in response to actuation of said trip by the next article, and means operatively connecting the plate circuit of each of said units with said operating means.*

References Cited in the file of this patent or the original patent

UNITED STATES PATENTS

| | | |
|---|---|---|
| 1,313,713 | MacFarland | Aug. 19, 1919 |
| 1,581,753 | Mayer | Apr. 20, 1926 |
| 1,697,010 | Jones et al. | Jan. 1, 1929 |
| 2,034,040 | Johnson | Mar. 17, 1936 |
| 2,362,753 | Huck | Nov. 14, 1944 |